Oct. 9, 1962 B. WEIL ET AL 3,057,655
PROGRESSIVELY COLLAPSIBLE COT
Filed Feb. 24, 1959 3 Sheets-Sheet 3
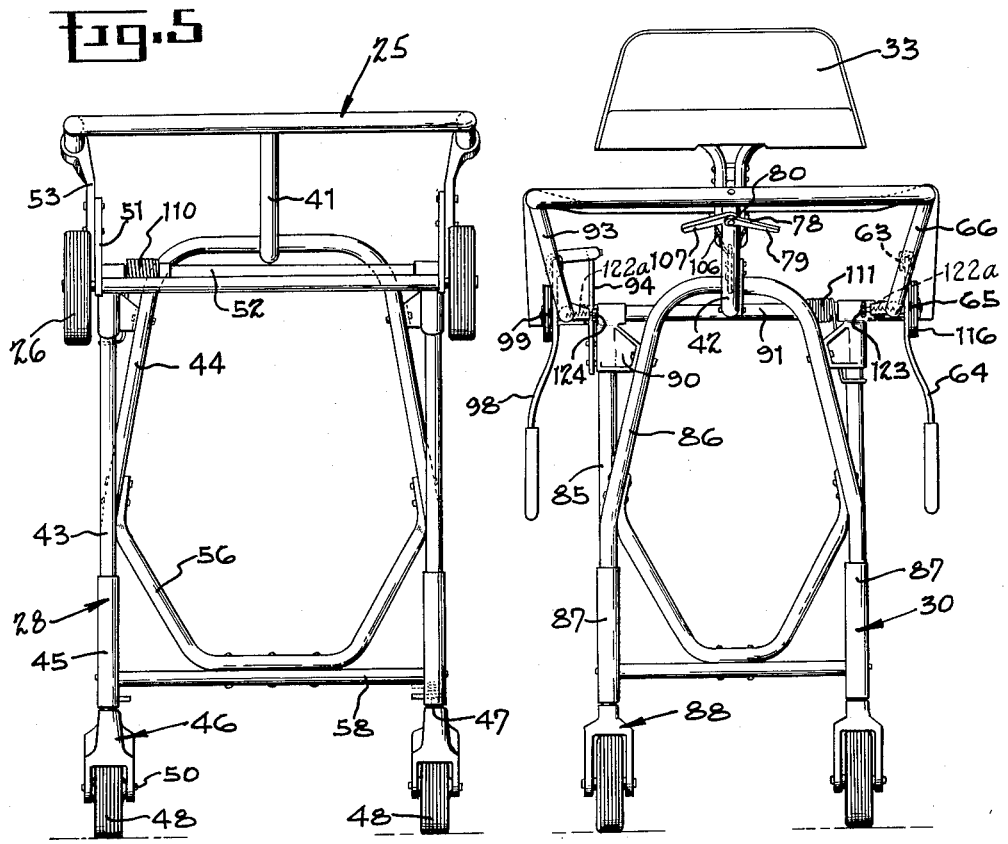
Fig.5
Fig.6
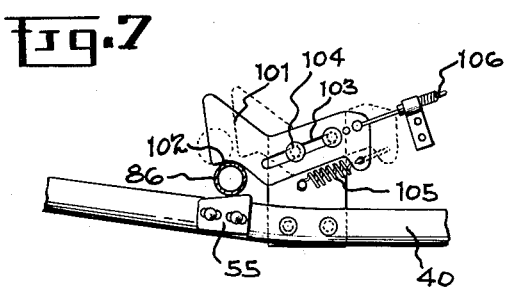
Fig.7
INVENTORS.
Burt Weil.
BY Wayne C. Cathey.
Wood, Herron & Evans.
ATTORNEYS.

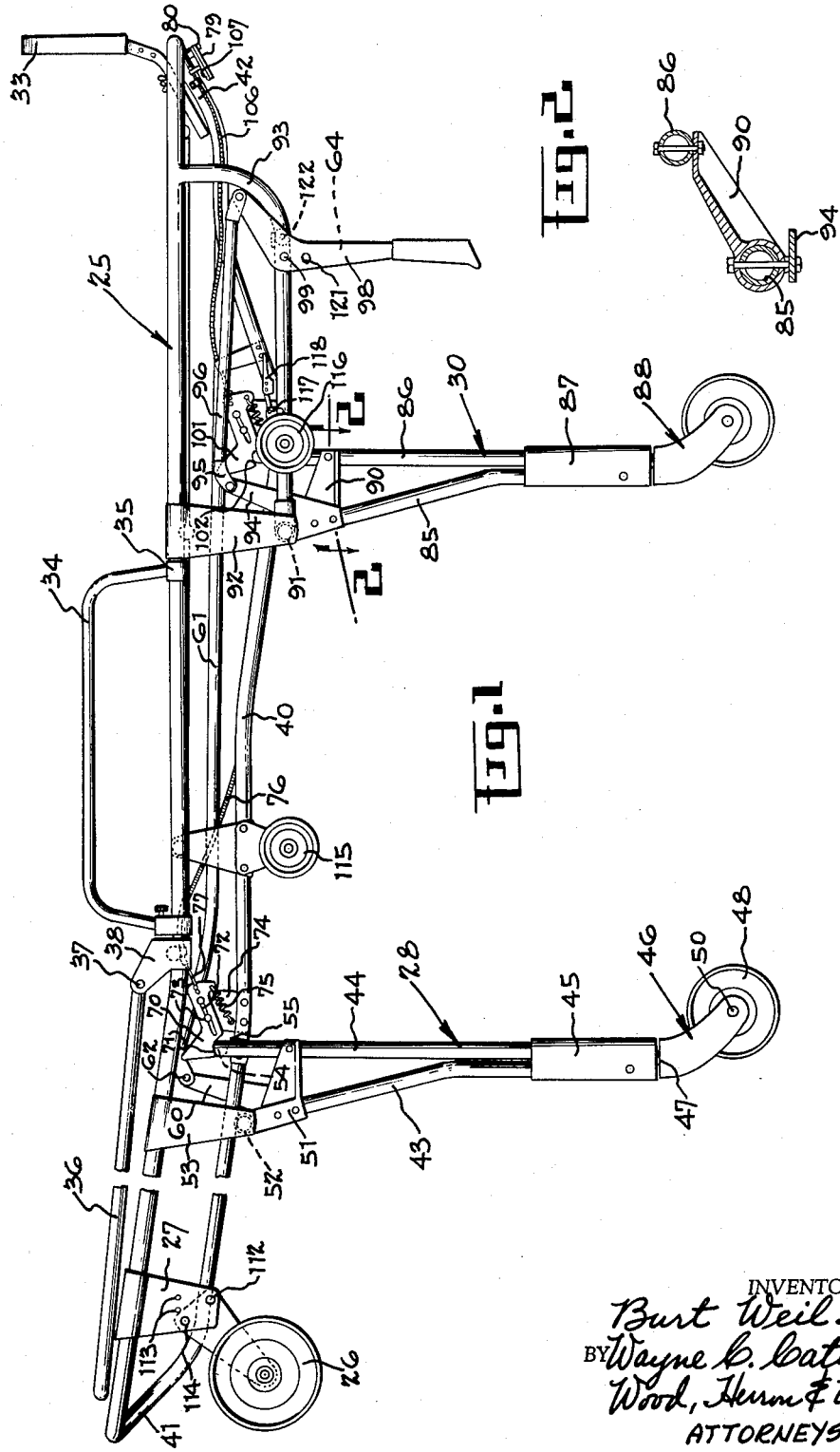

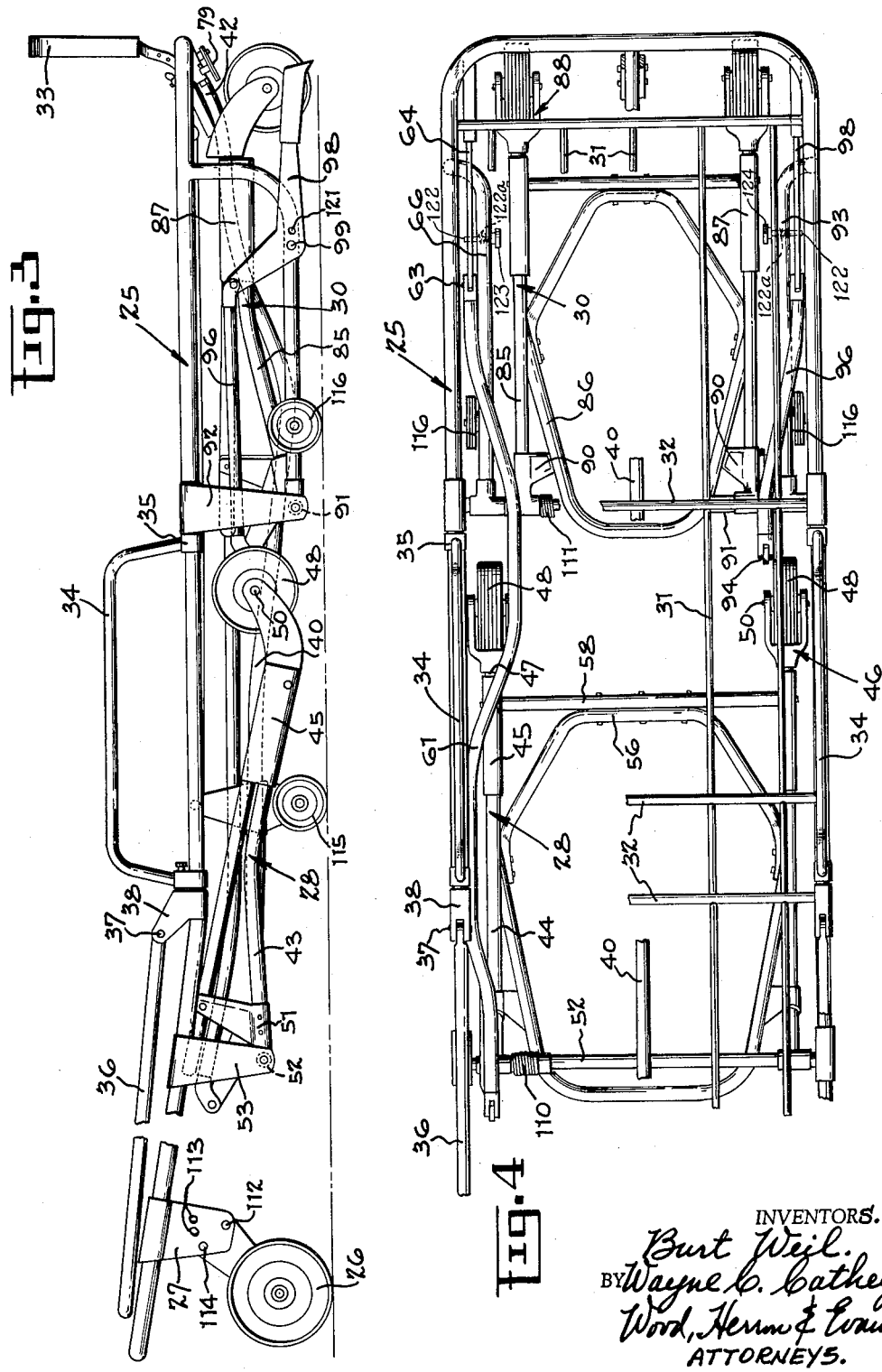

United States Patent Office 3,057,655
Patented Oct. 9, 1962

3,057,655
PROGRESSIVELY COLLAPSIBLE COT
Burt Weil, Cincinnati, Ohio, and Wayne C. Cathey, Chicago, Ill.; said Cathey assignor to said Weil
Filed Feb. 24, 1959, Ser. No. 795,061
8 Claims. (Cl. 296—20)

This invention relates to mortuary and ambulance carts having a carriage for supporting the cart, the carriage being collapsible by one man standing at the rear of the cart for loading and unloading the cart with respect to ambulance type vehicles.

The invention is an improvement in carts of the type disclosed in Patent No. 2,841,438 and copending applications, Serial Nos. 576,461 filed April 5, 1956, now Patent No. 2,877,047 and 666,182 filed June 17, 1957, now Patent No. 2,877,048.

The carts of the prior inventions were supported on two pairs of depending legs, all of the legs being joined together for unitary swinging between an erect position and a collapsed position in which the legs reside horizontally adjacent the frame. In operation of these prior inventions, the forward end of the frame, provided with auxiliary wheels, was disposed on the floor of an ambulance and the four legs were than collapsed as the operator standing at the rear of the cart would thrust the cart completely into the ambulance.

While these prior inventions have met with widespread acceptance in the field of emergency carts and have been regarded as a considerable advance in this art, the unitary operation of the supporting legs imposed limitations on the operation of the cart in two respects. First, in loading and unloading, the cart is supported only by the forwarding auxiliary wheels which rest on the floor of the vehicle when the legs are collapsed or extended; and as a consequence, it is necessary for the operator to support a large portion of the weight of the cart and its occupant, whose weight in some cases might be in the neighborhood of 300 pounds.

Second, it is necessary many times to shift a body on the ground into the cart and thereafter to raise the cart and the legs to the extended or erect position before thrusting the cart into the ambulance type vehicle. Considering again the necessity of handling quite heavy bodies, the unitary action of the legs requires an unusual strain to be imposed upon the operator to bring the cart from a collapsed position at ground level to its erect position.

The present invention eliminates the disadvantageous features of the earlier inventions by providing means for the selective or independent operation of the forward and rearward legs of the cart. Through the use of the present invention, it is possible now to roll a cart up to the ambulance type vehicle, collapse the forward legs so that most of the cart can be thrust into the vehicle while the cart and its occupant are supported by the fully extending rear legs. Thereafter the rear legs can be collapsed and the cart thrust fully into the vehicle with no undue strain upon the operator.

In unloading, a similar situation occurs with the steps being reversed. The cart with its occupant is partially withdrawn from the vehicle until the rear legs drop to the extended position. Thereafter the cart is fully supported at the rear by the rear legs and at the forward end by resting on the vehicle floor while the cart is almost completely withdrawn from the vehicle. Before the forward auxiliary wheels are removed from the floor of the vehicle, the forward legs are extended so that the cart is fully supported by its four legs, again with no strain being imposed upon the one man operator.

It has been an objective of the present invention therefore to provide a one man ambulance cart normally supported by forward and rearward pairs of legs with means for selectively operating the legs so that the operations of the cart can be effected with minimum strain imposed upon the one man operator.

Another problem for which the present invention provides a solution is the necessity of accommodating the cart to different vehicles having varying floor levels. In order to define the problem let it be assumed for the moment that the cart has forward auxiliary wheels which are at a fixed height above ground when the cart legs are extended. If the vehicle floor level is below the level of the wheels even as little as an inch or so it can be seen that during the process of withdrawing the cart the ground adjacent the vehicle would impede the extending of the supporting legs. There is, therefore, the risk of dumping the occupant on the ground if care is not exercised to ascertain that the forward legs are fully extended before the cart is completely withdrawn. On the other hand, if the floor level is higher than the level of the auxiliary wheels the thrusting of the cart into the vehicle is made difficult.

It has been another objective of the invention to provide a solution to this problem by pivotally mounting the bracket, on which the auxiliary wheels are rotatable, to the frame in an angularly adjustable manner so that the vertical position of the auxiliary wheels can be fixed at any of a plurality of settings.

It has been another objective of the invention to provide release actuating means adjacent the rear portion of the cart frame, the release actuating means being operable by the operator of the cart while maintaining support of the cart at the rear thereof.

It has been another objective of the invention to provide a generally triangular leg configuration pivoted to the frame at one apex, having the caster at another apex and braced in erect position by a movable abutment latch at the third apex. This leg design provides a positive means for locking the legs in erect position which can only be released by deliberate actuation of a lever connected to the abutment latch.

The configuration of the rear end of certain vehicles may not admit of the collapsing of the cart legs by engagement of the legs with the rear of the vehicle as the cart is thrust toward the vehicle. Accordingly, to increase the utility of the cart, an operating handle located at the rear of the cart has been associated with each pair of legs whereby the legs may be collapsed by the operator's pulling upon the levers. A pin and hole engagement between the operating handle and the frame is provided to lock the handle and consequently the legs in a collapsed position.

It has been another objective of the invention to provide wheels spaced along the frame of the cart to facilitate the introduction to and removal of the cart from the floor of the vehicle. A further objective has been to provide means for braking at least one of these wheels to prevent the accidental shifting of the cot within the vehicle.

These and other objectives of the invention will become more readily apparent from the following detailed description taken in conjunction with the accompanying drawings in which:

FIG. 1 is a side elevational view of one form of the invention;

FIG. 2 is a cross sectional view taken along lines 2—2 of FIG. 1;

FIG. 3 is a side elevational view of the invention in collapsed condition;

FIG. 4 is a top plan view thereof;

FIG. 5 is a front elevational view of the invention;

FIG. 6 is a rear elevational view thereof; and

FIG. 7 is a fragmentary elevational view of the leg locking mechanism.

One form which the invention may take is illustrated in FIGS. 1 to 7. The cart of this form of the invention comprises a generally oval shaped frame 25 having a pair of auxiliary wheels 26 adjustably mounted on a bracket 27 at the forward end of the frame and having a forward pair of legs 28 and a rearward pair of legs 30 mounted intermediate the forward and rearward ends of the frame. The frame is provided with a plurality of longitudinally extending rods 31 interconnected by transversely extending rods 32 which form the bed upon which the occupant is placed. The cart may be provided with the usual accessories such as the foot stop 33, the side rails 34 pivotally mounted at 35 to the frame 25 and the back rest 36 pivotally mounted at 37 to a bracket 38 fixed upon the frame 25.

A longitudinal frame member 40 extends centrally of the cart from the forward end as at 41 to the rearward end as at 42 to provide a support for the elements which lock the forward and rearward legs 28 and 30.

Forward Leg Lock and Actuator

The forward legs 28 comprise a pivotal mounting member 43 and a bracing member 44 which are rigidly joined together by a socket clamp 45, the lower end of which receives a caster 46. The caster 46 is pivoted about a vertical axis as at 47 to the socket 45 and has a wheel 48 rotatable about a horizontal axis 50.

The pivotal member 43 is fixed in a generally triangularly shaped fitting 51 which is pivotally mounted on a transverse frame member 52 located immediately below the longitudinal frame member 40 and supported by a bracket 53. The bracing member 44 is of inverted U-shape and is fixed near the bight end thereof to the fitting 51. The bight portion 54 of the bracing member 44 passes over the longitudinal frame member 40 and is engageable with a cam stop 55 when the leg is in an erect position. As indicated in FIG. 5, a U-shaped bracing member 56 fixed to the bracing member 44 and to a transverse rod 58 completes the leg construction. A lever arm 60 is fixed to the right hand leg as viewed from the rear of the cart and normally projects vertically. A link 61 is pivoted at its forward end 62 to the lever arm 60 and at its rear end 63 to a bell crank type operating handle 64. The bell crank handle 64 is pivoted at 65 to an L-shaped frame member 66 (the bell crank handle 64 appears in FIGS. 4 and 6 but is hidden by an identical bell crank arm which operates the rearward legs in FIGS. 1 and 3).

The forward legs are held in their vertical positions by a latch 70 having a latching surface 71 engaging the bight portion of a bracing member 44. The latch 70 has a slot 72 by which it is mounted on a pair of pins 73 mounted on a bracket 74. A tension spring 75 fastened between the latch 70 and bracket 74 normally urges the latch 70 to the position of FIG. 1. A Bowden cable 76 has one end 77 of its actuating member connected to the latch 70 and the other end 78 connected to a latch release actuator 79 pivotally mounted at 80 to the rear of the cart.

Rearward Leg and Lock Actuator

The rear leg is actuated and latched by a mechanism substantially the same as that applied to the forward legs. The rearward legs comprise the pivotal member 85 and a U-shaped bracing member 86 both rigidly fixed together by a socket 87 to which a caster 88 is mounted in a manner identical to that of the caster 46. The pivotal member is fixed to a fitting 90 (see also cross sectional view of FIG. 2) which is pivoted to a transverse tube 91 fixed to brackets 92. The tube receives the ends of the L-shaped frame member 66 on the right side of the cart as viewed from the rear, and an identical frame member 93 at the left side of the cart.

A lever arm 94 is fixed to the pivotal leg member 85 and is connected at its upper end to one end 95 of a link 96. The other end of the link 95 is connected to a bell crank operating handle 98 pivoted at 99 to the L-shaped frame member 93.

A latch 101 has a surface 102 engageable with a bight portion of the bracing member 86. The latch 101 has a slot 103 which receives pins 104 for sliding movement between latched and released position. A tension spring 105 normally urges the latch to the position shown in FIG. 1.

A Bowden cable 106 connects the latch to an operating handle 107 mounted at the rear of the cart. FIG. 7 is a detailed illustration of the rearward leg lock and its operation.

The forward and rearward legs are spring biased downwardly by a forward spring 110 mounted on transverse frame member 52 and a rearward spring 111 mounted on transverse frame tube 91 respectively (FIGS. 4, 5 and 6).

Wheels for Rolling Cart on Vehicle Platform

The first wheels to engage the vehicle platform as the cart is moved into the vehicle are the forward auxiliary wheels 26. The forward wheels are pivoted at 112 on two depending brackets 27. The depending brackets have apertures 113 cooperating with a pin 114 on the auxiliary wheel supports to permit the auxiliary wheels to be selectively positioned at varying heights in order to accommodate the cart to vehicles having platforms at varying heights.

Intermediate the forward and rearward end of the vehicle are two pairs of wheels 115 and 116 which will support the cart when the legs are collapsed and it is rolled into the vehicle. At least one of the rearward wheels 116 is provided with a brake shoe 117 which is operable by a lever 118 to lock the wheel 116 in order to prevent the shifting of the cart after it has been played in a vehicle.

In order to maintain the legs 28 and 30 in their collapsed position to facilitate rolling of the cart onto the vehicle floor and for other purposes, the bell crank handles 64 and 98 are provided with apertures 121 which receive pins 122 which are biased by springs 122a outwardly for engagement into the apertures 121 but which can be withdrawn inwardly by knobs 123 and 124 on the right and left sides of the cart respectively (FIG. 6). Through the engagement of the pins 122 with the apertures 121, it is possible to fix the bell crank handles in the positions which they attain when the legs are collapsed.

Operation

In order to describe the operation of the invention let it be assumed in the first instance that an occupant has been mounted onto the cart and the cart is ready to be thrust onto the floor of a hearse, ambulance, station wagon or the like. A single operator standing at the rear of the cart and gripping the rear portion of the frame 25 pushes the cart toward the vehicle until the wheels 26 are well supported by the floor of the vehicle. The operator then swings the lever 79 toward him to actuate the latch 70 through the Bowden cable 76. Withdrawal of the latch 70 frees the bracing member 44 of the leg 28 so that the leg 28 is free to swing to the collapsed position of FIG. 3. The bell crank handle 64 is pulled back thereby causing the lever arm 60 to rotate counter-clockwise, the force of the pull on the bell crank handle being transmitted to the lever arm 60 through the link 61. When the bell crank handle is swung to its extreme counter-clockwise position, the pin 122 snaps into the aperture 121 and holds the leg 28 in the collapsed position. It will be appreciated that during the collapsing of the leg 28, the cart is fully supported by the auxiliary wheels 26 on the vehicle platform at the forward end and by the legs 30 on the ground at the rearward end.

Having collapsed the forward leg, the operator continues to thrust the cart into the vehicle until the bumper of the vehicle is adjacent the rearward legs 30. The operator pulls the latch actuator 107 toward him which, through the Bowden cable 61, pulls the latch 101 back thereby freeing the leg bracing member 86 to swing to collapsed position. The handle 98 is pulled back thereby pivoting the lever arm 94 and attached legs 30 counter-clockwise through the link 96. The bell crank handle is fixed in the collapsed position by the pin and aperture engagement as described in connection wtih the operation of the forward legs.

It should be understood that the head of the occupant and the heavy trunk portion of his body are at the forward end of the cot so that at the time of collapsing the rearward legs approximately three-quarters of the cot of the cart and occupant are in the vehicle. Therefore, minimum support of the cart is required during the collapsing of the legs 30. After collapsing the legs 30, the cart is thrust all the way into the vehicle and the wheels 116 locked to prevent the rolling of the cart.

To remove the cart from the vehicle, a reverse operation takes place. The wheel 116 is unlocked and the cart is withdrawn a distance sufficient to permit the leg 30 to swing to the erect or extended position of FIG. 1. Thereafter the knob 124 is pulled to release the pin 122 from the aperture 121 of the operating handle 98. The force of spring 111 urging the legs downwardly causes the legs to snap into the locked, extended position of FIG. 1, the latch 101 having been returned to the latching position by the tension spring 105.

At this point in the operation, the cart is now fully supported at its rearward end by the legs 30 and at the forward end by the auxiliary wheels 26 and the rolling wheels 115.

The cart is then further withdrawn a distance sufficient to permit the forward legs 28 to swing to the erect position of FIG. 1 but insufficient to permit the auxiliary wheels 26 to roll off the platform. In this position wherein the cart is fully supported by the rearward legs 30 and auxiliary wheels 26, the knob 123 is actuated to release the bell crank handle 64. Thereafter the spring 110 snaps the forward legs into a downward position.

While there has been disclosed in the above description, what is deemed to be the most practical and efficient embodiment of the invention, it should be well understood that the invention is not limited to such embodiment as there might be changes made in the arrangement, disposition and form of the parts without departing from the principle of the present invention as comprehended within the scope of the accompanying claims.

Having described our invention, we claim:

1. A cart comprising an elongated frame, forward and rearward legs pivotally mounted on said frame for rearward pivotal movement, forward and rearward releasable means operable to brace said forward and rearward legs in a downwardly extended position, means for selectively actuating said releasable means independently of each other to permit said legs to be pivoted to a collapsed position, a pair of handles pivoted to the rear of said frame, and link means connecting said handles to forward and rearward legs respectively to swing said legs to collapsed position when said handles are pivoted, whereby, as a cart is thrust onto the platform of a vehicle by an operator standing at the rear of the cart, the forward legs can be first collapsed and then the rearward legs collapsed after a substantial portion of the cart is on the vehicle platform.

2. A cart according to claim 1 further comprising a pin and hole connection between said handles and said frame to fix said handles and legs in collapsed position.

3. A cart according to claim 2 in which said pin is mounted in said frame and each said handle has a hole to receive its respective pin, and spring means normally biasing said pin toward said handle.

4. A cart comprising an elongated frame, forward and rearward legs mounted on said frame for pivotal movement toward the rear of the cart, forward and rearward releaseable means operable to brace said forward and rearward legs in a downwardly extended position, an antifriction support mounted at the forward end of said frame independently of the legs adjacent the underside of said frame, means mounted at the rearward end of said frame for selectively actuating said releasable means independently of each other to permit said legs to be pivoted to a collapsed position, whereby, as a cart is thrust onto the platform of a vehicle by an operator standing at the rear of the cart, the forward legs are released and collapsed and then the rearward legs are released after a substantial portion of the cart is on the vehicle platform, and roller wheels rotatably mounted on said frame independently of said legs for engagement with the vehicle platform to provide antifriction means for facilitating the thrusting of said cart into said vehicle, at least one of said roller wheels having brake means associated therewith to maintain the cart against shifting within the vehicle.

5. A cart comprising an elongated frame, forward and rearward legs, each of said forward and rearward legs being generally triangularly configurated in side elevation, means pivotally mounting each said legs to said frame at one apex of said legs, for pivotal movement toward the rear of said cart, wheels rotatably mounted at another apex of said legs, and latch abutment means engageable with the remaining apex of said legs to lock said legs in erect position, forward and rearward actuators operable to remove respective latch abutments from engagement with said legs independently of each other to permit said legs to be pivoted to a collapsed position, whereby, as a cart is thrust onto the platform of a vehicle by an operator standing at the rear of the cart, the forward legs are released and collapsed and then the rearward legs are released after a substantial portion of the cart is on the vehicle platform.

6. A collapsible leg structure for an ambulance cart frame having at least one longitudinal frame member comprising, a pair of generally vertical pivot members pivotally mounted at the upper end on each side of said frame, a generally U-shaped vertical bracing member having its legs rigidly fixed to said pivot members below the pivotal engagement with said frame, the bight of said U-shaped member passing over said longitudinal frame member and being engageable therewith when said leg structure is erect, a latch abutment slidably mounted on said frame member and engageable with the upper surface of said bight portion when said leg structure is erect and a spring normally urging said latch abutment toward a position of engagement with said bracing member.

7. A collapsible leg structure for an ambulance cart frame having at least one longitudinal frame member comprising, a pair of generally vertical pivot members pivotally mounted at their upper ends on each side of said frame, a generally U-shaped vertical bracing member having its legs rigidly fixed to said pivot members below the pivotal engagement with said frame, the bight portion of said U-shaped member passing over said longitudinal frame member and being engageable therewith when said leg structure is erect, and a latch abutment slidably mounted on said frame member and engageable with the upper surface of said bight portion when said leg structure is erect.

8. A collapsible leg structure for an ambulance cart frame member comprising, a generally vertical pivot member pivotally mounted at the upper end of said frame, a generally vertical bracing member having its lower end rigidly fixed to said pivot member below the pivotal engagement with said frame, and having its upper end spaced from the upper end of said pivot member, and a latch abutment movably mounted on said frame member and engageable with the upper surface of said bracing member when said leg structure is erect.

References Cited in the file of this patent

UNITED STATES PATENTS

| | | |
|---|---|---|
| 721,610 | Scott | Feb. 24, 1903 |
| 1,273,638 | Lyon | July 23, 1918 |
| 2,564,333 | Kelley | Aug. 14, 1951 |
| 2,565,820 | Machanic | Aug. 28, 1951 |
| 2,656,942 | Helms | Oct. 27, 1953 |
| 2,747,919 | Ferneau et al. | May 29, 1956 |
| 2,841,438 | Weil | July 1, 1958 |

FOREIGN PATENTS

| | | |
|---|---|---|
| 1,097,953 | France | Feb. 23, 1955 |